(12) United States Patent
Lund

(10) Patent No.: US 6,406,101 B2
(45) Date of Patent: Jun. 18, 2002

(54) SHOCK ABSORBING BICYCLE WHEEL HUB

(76) Inventor: Morten Andre Lund, 1291 Simpson Way, Suite D, Escondido, CA (US) 92029-1434

( * ) Notice: Subject to any disclaimer, the term of this patent is extended or adjusted under 35 U.S.C. 154(b) by 0 days.

(21) Appl. No.: 09/846,598

(22) Filed: Apr. 30, 2001

Related U.S. Application Data

(63) Continuation-in-part of application No. 09/607,199, filed on Jun. 30, 2000, now Pat. No. 6,322,153.

(51) Int. Cl.[7] .............................................. B60B 27/00
(52) U.S. Cl. ......................... 301/110.5; 152/40; 152/44
(58) Field of Search ........................... 301/5.1, 5.3, 5.7, 301/105.1, 110.5, 110.6; 152/17, 40, 44, 45, 46, 47, 48, 49, 50, 51; 280/11.22, 11.23, 124.166, 124.169; 267/276

(56) References Cited

U.S. PATENT DOCUMENTS

| | | | | |
|---|---|---|---|---|
| 1,185,098 A | * | 5/1916 | Hopkins | |
| 5,393,078 A | * | 2/1995 | Bourdeau | 280/11.22 |
| 5,573,309 A | * | 11/1996 | Bekessy | 301/5.301 |

FOREIGN PATENT DOCUMENTS

| | | | | |
|---|---|---|---|---|
| FR | 2676397 | * | 5/1991 | 152/17 |
| GB | 29276 | * | 12/1896 | 152/47 |

* cited by examiner

*Primary Examiner*—Russell D. Stormer
(74) *Attorney, Agent, or Firm*—Gene Scott-Patent Law & Venture Group

(57) ABSTRACT

A shock absorbing bicycle wheel hub apparatus uses an open ended, cylindrical shock absorber housing mounted concentrically within a wheel hub. The wheel hub is adapted for rotation about the shock absorber housing. A pivot rod is axially aligned with the shock absorber housing and rotationally mounted within its sidewall. Terminal ends of the pivot rod engage cover plates fixedly mounted thereon. A pressure tube is axially aligned with the shock absorber housing and extends through it so that its terminal ends may be fixed in the cover plates. A shock absorbing medium is compressively positioned between the pressure tube and an interior surface of the shock absorber housing. The cover plates engage a bicycle fork so that weight supported by the bicycle fork is transmitted through the cover plates and the pressure tube to the shock absorbing medium, and thereby, through the shock absorber housing and the wheel hub to a wheel of the bicycle. Likewise, road shocks are transmitted through the shock absorbing medium.

7 Claims, 2 Drawing Sheets

SHOCK ABSORBING BICYCLE WHEEL HUB

The present invention is a continuation-in-part and claims the priority date of a prior filed regular patent application having Ser. No. 09/607,199 and an official filing date of Jun. 30, 2000 now U.S. Pat. No. 6,322,153 and which discloses a portion of substantially the same material as described herein.

BACKGROUND OF THE INVENTION

1. Field of the Invention

This invention relates generally to shock absorbing systems for vehicles and more particularly to a bicycle wheel mounting system providing a shock absorbing element contained within a bicycle wheel hub.

2. Description of Related Art

The following art defines the present state of this field:

Mark et al, U.S. Pat. No. 1,457,538 describes a hub having pockets therein; a felloe; an annular ring reinforcing said felloe within said felloe; outwardly curved spring spokes, each mounted within one of the pockets of said hub, each spoke having an inwardly curved end resting upon the outwardly curved portion of the adjacent spoke; a thimble mounted within said felloe respective to each of said spokes; a raised seat upon said annular ring for each of said spokes; and a bolt for each of said spokes, said bolt passing through the spoke and its raised seat upon said annular ring and being threaded into one of said thimbles.

Hastings, Jr., U.S. Pat. No. 3,072,169 describes a resilient wheel comprising an axle member, mounting means supported from said axle member having first and second annular axially spaced portions, an axle retainer member secured at one end of the axle member for supporting one of said mounting portions and maintaining a fixed axial spacing of said first and second portions, said axle and axle retainer members together comprising axle means, said mounting means being non-rotatable and each portion thereof including resilient shear rings, bearing means axially intermediate said first and second portions, and rim means mounted upon said bearing means for rotation radially outwardly of the mounting means.

Black, U.S. Pat. No. 4,294,491 describes a wheel construction having bearing means therein defining an axis of rotation. The bearing means is housed in an elastomeric sleeve having an elastic compressibility characteristic. A pair of identically shaped metallic stampings, each having a central cylindrical shell part axially aligned with the other, is provided for housing the bearing structure therein. Each of the stampings has a surface portion intermediate the central cylindrical shell part and the outer periphery thereof, which are coextensive with a central plane through the wheel construction perpendicular to the axis of rotation. The axially aligned cylindrical shell parts engage at least a portion of the elastomeric sleeve of the bearing structure. An annulus of moldable synthetic resin material is fixedly secured to the peripheral surface of the pair of metallic stampings to hold the cylindrical shell part and the surface portions in axial alignment. The annulus has an elastically flexible characteristic to thereby permit the pair of stampings to shift radially relative to one another while maintaining said surface portions in sliding engagement with one another.

Black, U.S. Pat. No. 4,295,686 describes a wheel construction including a rigid circular disk having a hole therethrough in the approximate center thereof. A bearing structure housed in a flexible sleeve is resiliently supported in the hole to facilitate a rotation of the disk about a defined axis of rotation. An annulus of moldable synthetic resin material is fixedly secured to the peripheral surface of the disk. The annulus has a rigid characteristic and the periphery thereof defines a tread mounting surface. An annular tread made of moldable synthetic resin material is fixedly secured to the tread mounting surface on the annulus. The tread has an outer diameter that is precisely concentric with the axis of rotation of the wheel. The materials of the tread and of the annulus are compatible with each other such that the tread becomes bonded to the annulus upon a molding thereof around the peripheral surface of the annulus. In one embodiment, the rigid circular disk is composed of a pair of identical metal stampings which are held together solely by the annulus.

Kim et al, U.S. Pat. No. 4,602,822 describes an apparatus for varying eccentrically or centrically the shaft of the bicycle wheel in order that the bicycle can run up and down like horseback riding beside regular level riding. The apparatus has an eccentric hub including a shaft housing formed integrally in eccentric position between two hub discs having an opening and a shaft penetrated through said shaft housing, two circular supporting plates coupled rigidly each other by three connecting rods to reserve revolvably said eccentric hub therebetween, each which has a hub disc housing formed in its eccentric position said hub disc housing has a relatively large hole on its centric portion to exposure the shaft and also a plurality of openings corresponding to different eccentric positions on its circumference of circle, and a resettable spring loaded rod for locking the eccentric hub between the hub disc housings of the circular supporting plates by passing through the openings in alignment with each other.

Tsai, U.S. Pat. No. 4,755,005 describes a hub of a bike or multiple-wheel cycle which is formed with an eccentric wheel or axle in the hub and the eccentric axle having a chain sprocket thereon rotatably mounted with a spindle fixed on a frame fork so that upon the rotation of the axle, the hub and any rear or front wheel secured on the hub will be rotated eccentrically to cause a cam-like action to mimic a horse-riding so as to spur the player or rider interest.

Bach, U.S. Pat. No. 6,019,435 describes a wheel hub with suspension including a carrier arm, a swivel axle and a hub body rotatably secured to the swivel axle. A resilient element is positioned between the carrier arm and the swivel axle. A load on the wheel or the hub body will cause the swivel axle to be displaced relative to the carrier arm, whereby the resilient element is deformed and exercises its resilient effect. The wheel hub may be used in many different applications and for many different types of wheels, such as wheels on vehicles, driving wheels, and support wheels.

The prior art, especially Bach, teaches a shock absorbing system placed within the structure of a wheel such that the wheel hub may be used for providing a smooth support to a rolling vehicle or device such as a skate or bicycle. However, the prior art does not teach that the shock absorbing system may be fitted within the wheel hub in a manner that prevents lateral movement and the related wear of such, eliminates bearing run-out and constitutes a relatively simple design providing for inexpensive construction. The present invention fulfills these needs and provides further related advantages as described in the following summary.

SUMMARY OF THE INVENTION

The present invention teaches certain benefits in construction and use which give rise to the objectives described below.

A shock absorbing bicycle wheel has an open ended, cylindrical shock absorber housing mounted concentrically within a wheel hub. The wheel hub is adapted for rotation about the shock absorber housing. A pivot rod is axially aligned with the shock absorber housing and rotationally mounted within its sidewall. Terminal ends of the pivot rod engage cover plates fixedly mounted thereon. A pressure tube is axially aligned with the shock absorber housing and extends through it so that its terminal ends may be fixed in the cover plates. A shock absorbing medium is compressively positioned between the pressure tube and an interior surface of the shock absorber housing. The cover plates engage a bicycle fork so that weight supported by the bicycle fork is transmitted through the cover plates and the pressure tube to the shock absorbing medium, and thereby, through the shock absorber housing and the wheel hub to a wheel of the bicycle. Likewise, road shocks are transmitted through the shock absorbing medium.

A primary objective of the present invention is to provide an apparatus and method of use of such apparatus that provides advantages not taught by the prior art.

Another objective is to provide such an invention capable of absorbing road shocks.

A further objective is to provide such an invention capable of being constructed at low cost.

A still further objective is to provide such an invention capable of being housed within the hub of a bicycle wheel.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
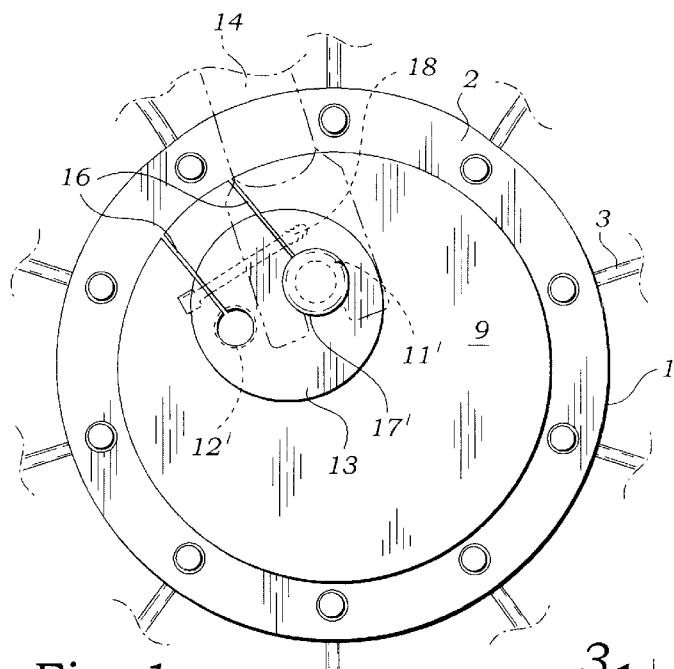
FIG. 1 is a left side elevation view of the preferred embodiment of the invention.

The above described drawing figures illustrate the invention in at least one of its preferred embodiments, which is further defined in detail in the following description.

A shock absorbing bicycle wheel hub apparatus comprises an open ended, cylindrical shock absorber housing 10 mounted concentrically within a wheel hub 1. The wheel hub 1 is adapted for rotation about the shock absorber housing 10 as will be defined further below. A pivot rod 7 (or tube) is axially aligned with the shock absorber housing 10 and rotationally mounted within a sidewall inwardly directed portion 8. Terminal ends 11 of the pivot rod 7 extend outwardly from open ends of the shock absorber housing 10. Each one of a pair of cover plates 9 is fixedly mounted on one of the terminal ends 11 of the pivot rod 7 for rotation with it. A pressure tube 7' is axially aligned with the shock absorber housing 10 and extends through it with terminal ends 12 of the pressure tube 7' fixedly engaged within the cover plates 9. A shock absorbing medium 5 is compressively positioned between the pressure tube 7' and an interior surface 10' of the shock absorber housing 10. The cover plates 9 provide a means for engaging 13 a bicycle fork 14 such that weight supported by the bicycle fork 14 is transmitted through the cover plates 9 and the pressure tube 7' to the shock absorbing medium 5, and thereby, through the shock absorber housing 10 and the wheel hub 1 to a wheel of the bicycle (not shown). Therefore, roadway shock forces received by the bicycle wheel are transmitted through the shock absorbing medium 5 to the bicycle fork 14. The shock absorbing medium 5 is adapted for beneficially changing waveforms of the roadway shock forces from sharp spikes or pulses, to more slowly changing waves and is thus able to average such forces over time providing a more comfortable and less jarring ride.

Figure 2:
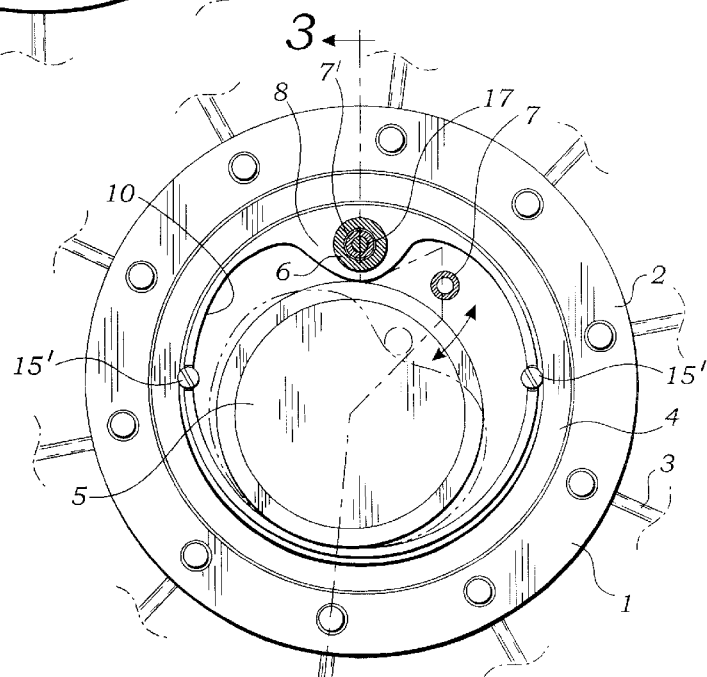
FIG. 2 is a right side elevation view of the preferred embodiment with a hub cover of the invention removed.

It can be clearly seen in FIG. 2 that the pressure tube 7' moves in an arc with the pivot rod 7 at the arc's center. Clearly, it can be seen that when weight is applied to the bicycle fork 14, as when a rider's weight is applied to the bicycle, it causes rotation of the shock absorber housing 10 about the pivot rod 7. This, in turn, causes pressure tube 7' to compress shock absorbing medium 5 as shown in FIG. 2 in phantom lines. Road shocks cause the same result. In both cases, the shock absorbing medium 5 is able to receive fixed weight changes as well as transient shocks and react by compressing through elastic deformation, and thereafter recover elastically, spreading such forces over time.

Figure 3:
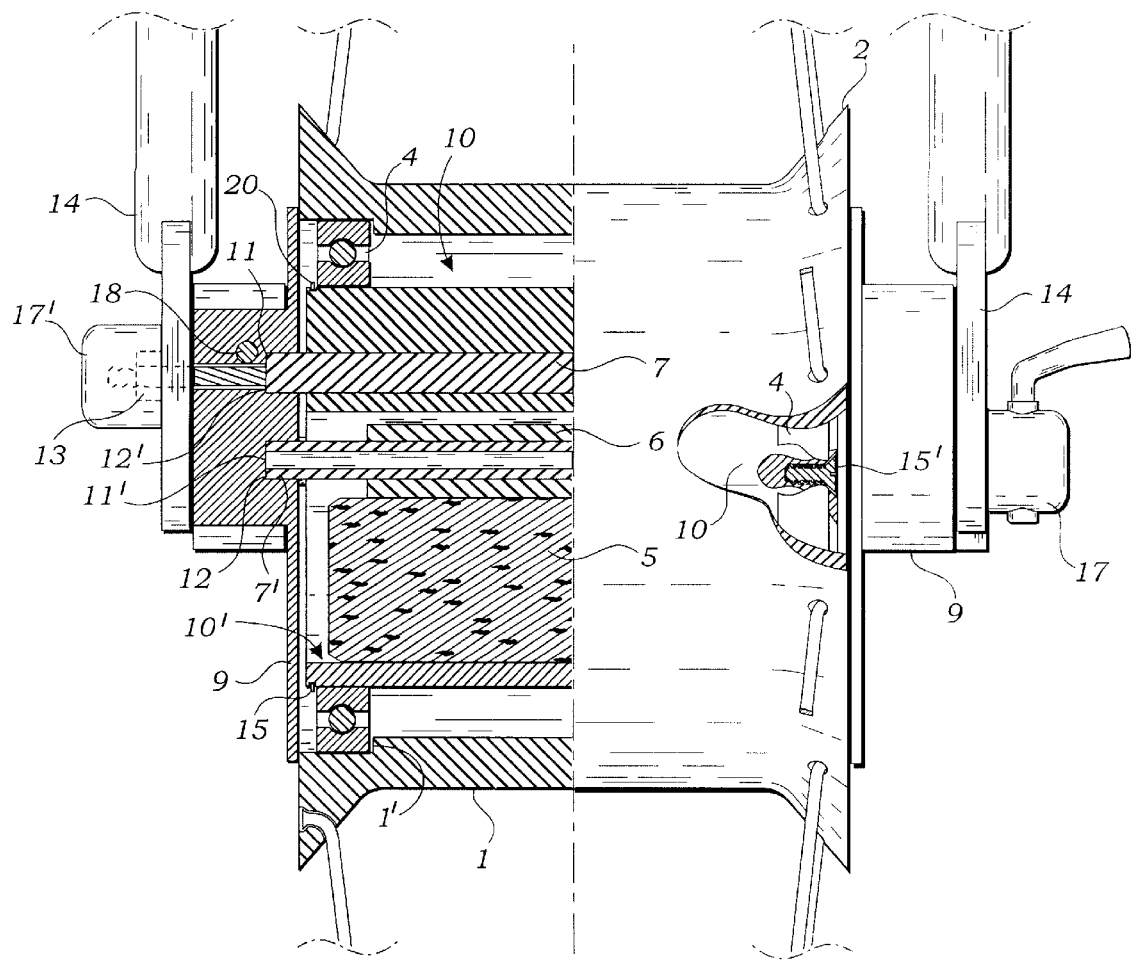
FIG. 3 is a front elevation view thereof shown in half-section taken along line 3—3 in FIG. 2.

The adaptation of the wheel hub 1 for rotation about the shock absorber housing 10 is preferably through a pair of spaced apart bearing assemblies 4 as best seen in FIG. 3. It can be seen in FIG. 3 that a means for eliminating bearing play within the bearing assemblies 4 is applied. The play eliminating means includes an annular groove 20 and a removable spring retainer 15 inserted into the annular groove 20. The retainer 15 abuts one of the pair of bearing assemblies 4 at its inner race, as can be clearly seen in FIG. 3. The play eliminating means further includes plural screws 15' threadedly mounted and positioned for compressively engaging the other of the pair of bearing assemblies. The screws 15' selectively press against the inner race of the other of the pair of bearing assemblies 4 driving these inner races toward the center of the housing 10, while the corresponding outer race is restricted in its movement by a shoulder 1' of hub 1. Likewise, hub 1 presses against the outer race of the one of the pair of bearing assemblies 4, which tends to move to the left in FIG. 3, while the corresponding inner race is blocked by spring retainer 15. Therefore, bearing play is able to be adjusted and, if desired, completely eliminated through the tightening of screws 15'.

Preferably, the shock absorbing medium 5 is of an open cell elastic material such as a rubber or similar substance. Open cell materials are able to assume a smaller volume when under compression and this is highly advantageous in the present application wherein limited space is available within the shock absorber housing 10 for the medium 5 to be displaced under elastic deformation. The fork securing means 13 is preferably a pair of bosses, one on each of the cover plates 9, as shown, which are positioned to receive the forks 14. To secure the fork 14 in place on the bosses 13 a screw 17 is mounted with a nut 17' as shown in FIG. 3. In a preferred embodiment a tubular sheath 6 is rotationally mounted on the pressure tube 7' and positioned for rolling contact with the shock absorbing medium 5 so as to avoid wear of the medium 5. In the preferred embodiment, the pivot rod 7, and the pressure tube 7' are both captured, at their ends, 11 and 12 respectively, by holes 11' and 12' respectively, in cover plates 9.

It can be seen in FIG. 1 that cover plates 9 each have two slits 16 which separate the cover plates 9 into three portions.

These two slits 16 are cut respectively into holes 11' and 12'. A means for compressing 18 toward a center of the three portions between an outer pair of the three portions is used for clamping each of the cover plates 9 onto the pivot rod 7 and the pressure tube 7'. This is the primary means for mounting the cover plates 9. The compressing means is preferably a screw 18 fitted into cap 9 as shown in FIG. 1 for drawing the three portions of cap 9 together such that holes 11' and 12' are tightened on rod end 11 and tube end 12 respectively. In this manner the several parts are made into a integral and functional assembly.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shock absorbing bicycle wheel hub apparatus comprising: a cylindrical shock absorber housing mounted concentrically within a wheel hub, the wheel hub adapted for rotation about the shock absorber housing; a pivot rod axially aligned with the shock absorber housing and mounted within a sidewall inwardly directed portion thereof, terminal ends of the pivot rod extending from open ends of the shock absorber housing; each one of a pair of cover plates fixedly mounted on one of the terminal ends of the pivot rod for rotation therewith; a pressure tube axially aligned with the shock absorber housing and extending therethrough, terminal ends of the pressure tube fixedly engaged with the cover plates; and a shock absorbing medium compressively positioned between the pressure tube and an interior surface of the shock absorber housing; the cover plates providing means for engaging a vehicle, such that roadway shock forces are transmitted through the shock absorbing medium for beneficially changing waveforms of said roadway shock forces and for averaging such forces.

2. The apparatus of claim 1 wherein the adaptation of the wheel hub for rotation about the shock absorber housing is a pair of spaced apart bearing assemblies.

3. The apparatus of claim 2 wherein the shock absorber housing provides a means for eliminating bearing play in the bearing assemblies, the play eliminating means including an annular groove and a spring retainer therein, the groove and retainer abutting one of the pair of bearing assemblies; and plural screws compressively engaged with the other of the pair of bearing assemblies.

4. The apparatus of claim 1 wherein the shock absorbing medium is an elastically compressible material.

5. The apparatus of claim 1 further comprising a fork securement comprising a rod extending through the pressure tube and the cover plates for engaging locking means in lateral opposition to the bicycle fork.

6. The apparatus of claim 1 further comprising a tubular sheath rotationally mounted on the pressure tube, the tubular sheath positioned for rolling contact with the shock absorbing medium.

7. The apparatus of claim 1 wherein the cover plates each provide two slits, the slits separating the cover plates into three portions; and a means for compressing a center of the three portions between an outer pair of the three portions in clamping each of the cover plates onto the pivot rod and the pressure tube.

\* \* \* \* \*